Sept. 29, 1953 N. HELSEL, JR 2,653,847
ENDGATE CONTROL FOR DUMP TRUCKS
Filed Dec. 21, 1948 2 Sheets-Sheet 1
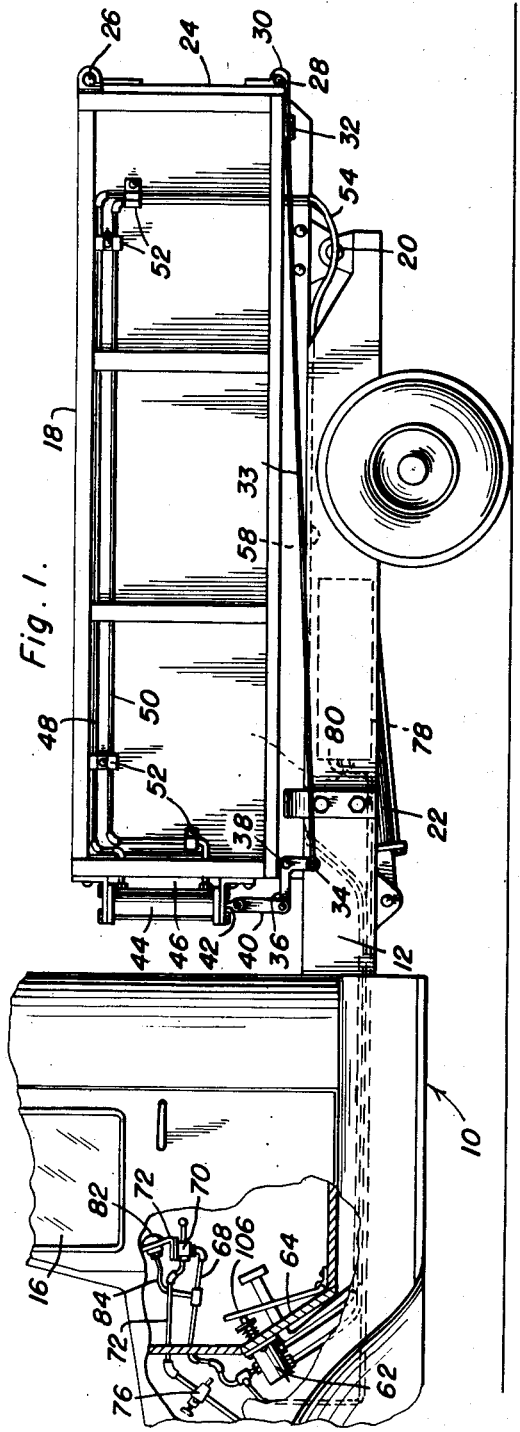
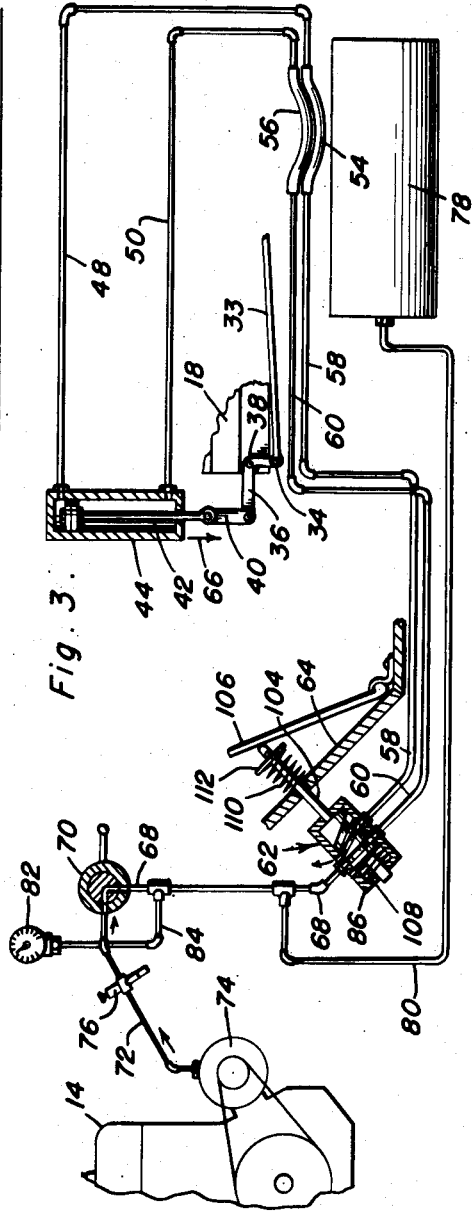
Noah Helsel, Jr.
INVENTOR.

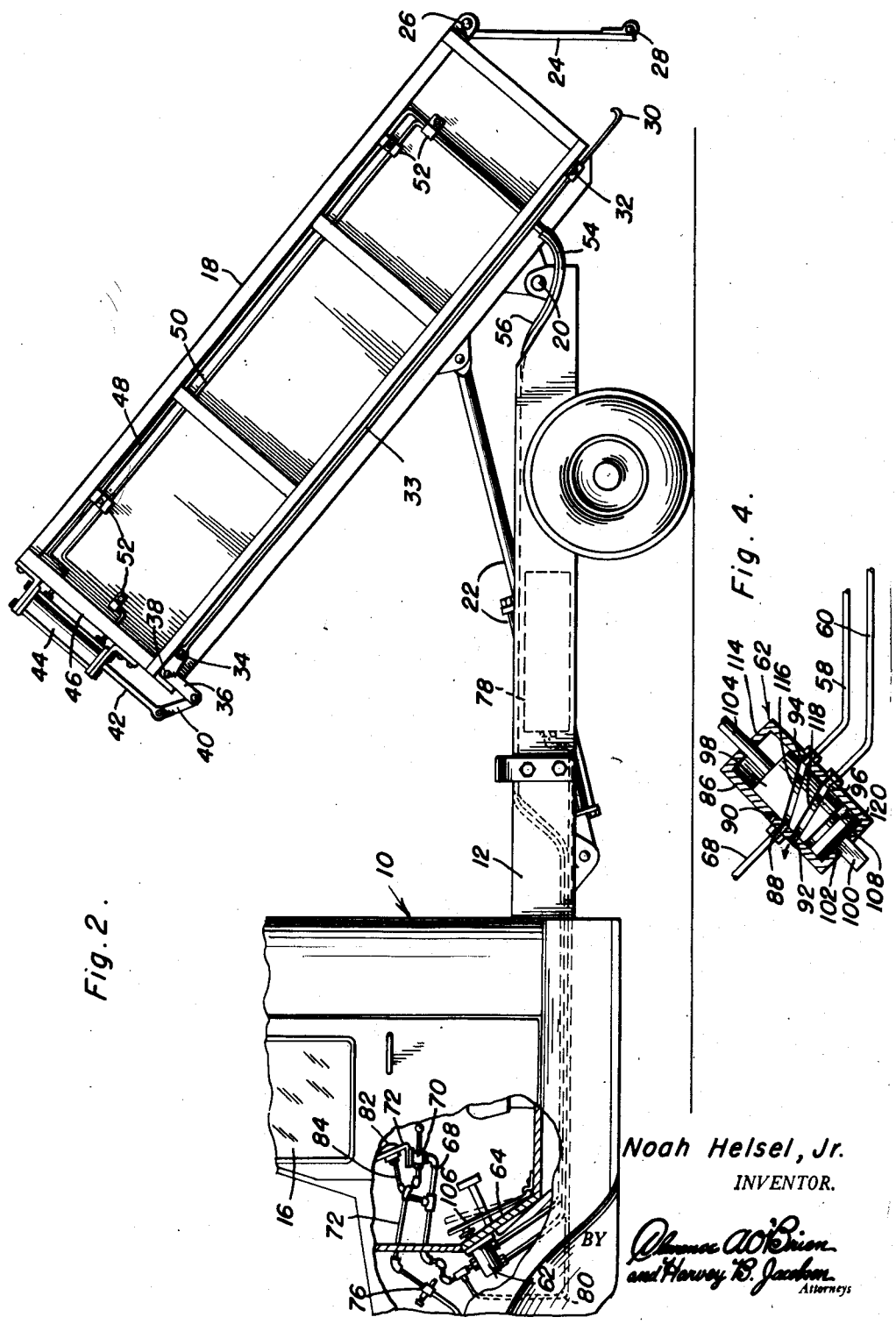

Patented Sept. 29, 1953

2,653,847

UNITED STATES PATENT OFFICE 2,653,847

ENDGATE CONTROL FOR DUMP TRUCKS

Noah Helsel, Jr., Lake City, Mich.

Application December 21, 1948, Serial No. 66,416

1 Claim. (Cl. 298—23)

This invention relates to new and useful improvements and structural refinements in controls for end gates on dump trucks, and the principal object of the invention is to facilitate convenient locking and unlocking of the end gate by remote control from the operator's cab of the truck.

This object is achieved by the provision of a gate locking latch and a compressed air cylinder operatively connected to the latch, the cylinder receiving its supply of compressed air from an air pump driven by the truck engine and a control valve being provided in the operator's cab for regulating the supply of air to the cylinder.

An important feature of the invention resides in the particular construction of the control valve per se, this being actuated by foot pressure and being so arranged that double acting operation of the cylinder may be controlled to selectively lock and unlock the end gate latch.

The air compressor or pump and the control valve are mounted on the engine and in the operator's cab respectively, while the latch operating cylinder is mounted on the tiltable dump truck body. Accordingly, a further feature of the invention resides in the provision of means for delivering compressed air from the compressor to the cylinder without interference from the tilting action of the truck body.

Some of the advantages of the invention lie in its simplicity of construction, in its convenience of operation, and in its adaptability for use on vehicles of various sizes and types.

With the above more important objects and features in view and such other objects and features which may become apparent as this specification proceeds, the invention consists essentially of the arrangement and construction of parts as illustrated in the accompanying drawings, in which:

Figure 1 is a fragmentary side elevational view of a dump truck, the same being partially broken away so as to reveal the invention in situ thereon;

Figure 2 is a fragmentary side elevational view, similar to that shown in Figure 1, but showing the dump truck body in its tipped position;

Figure 3 is a diagrammatic view of the invention per se, and

Figure 4 is a cross sectional view of the control valve used in the invention.

Like characters of reference are employed to designate like parts in the specification and throughout the several views.

Referring now to the accompanying drawings in detail, the general reference character 10 designates a dump truck including a frame or chassis 12 carrying an engine 14, an operator's cab 16 and a rearwardly tiltable body 18 which is pivotally attached to the chassis 12 as at 20. Tilting of the body may be effected in any suitable manner, such as for example, by a hydraulic cylinder unit 22 of a conventional type.

The body 18 is provided with an end gate 24 which is pivoted to the body 26 and is swingable rearwardly from its closed position shown in Figure 1 to its open position shown in Figure 2.

The gate 24 is provided at one side of its lower edge portion with a laterally projecting latch member or pin 28 which is engageable by a hook-shaped latch member 30 when the gate 24 is in its closed position, so that opening of the gate is prevented.

The latch member 30 is slidable longitudinally in a suitable bracket 32 attached to the body 18 and a shaft 33 which constitutes an integral continuation of the latch member 30 extends longitudinally and forwardly on the body, having its forward end pivoted as at 34 to one arm of a bell crank 36.

The bell crank 36 is pivoted to the body 18 as at 38 and the remaining arm thereof is pivotally connected by means of a suitable link 40 to the outer end portion of a piston rod 42 of a double acting air cylinder 44. The cylinder 44 is suitably secured to the body 18, preferably to the forward end wall 46 of the body, and a pair of air lines 48, 50 are secured to the body as at 52 and communicate respectively with the upper and lower ends of the cylinder 44, as will be clearly apparent. The air lines 48, 50 are connected by a pair of flexible hoses 54, 56 respectively, to a pair of air pipes 58, 60, the latter communicating with a control valve 62 provided under the floor board 64 of the operator's cab 16.

The construction of the control valve 62 will be hereinafter detailed, but in the meantime it may be stated that the valve is used for delivering compressed air selectively through the pipes 58, 60, so that when air is delivered through the pipe 58, it passes through the hose 54 and the air line 48 to the upper end of the air cylinder 44, thus causing the piston rod 42 to move in the direction of the arrow 66 (see Figure 3). As a result, the associated linkage 40, 36 and 33 slides the latch member 30 from the position shown in Figure 1 to the position shown in Figure 2, so that when the body 18 is tipped by the hydraulic cylinder unit 22, the end gate 24 is free to swing to its open position, substantially as shown. However, after the body 18 is lowered to its normal, horizontal position, the gate 24 closes by gravity, and the valve 62 may then be actuated so as to deliver compressed air through the pipe 60, hose 56 and line 50 into the lower end of the cylinder 44, thus reversing the action of the linkage 40, 36, 33 and engaging the latch members 30, 28, so that the end gate is effectively locked. As will be hereinafter seen, the control valve 62 is arranged to facilitate releasing air pressure from one side of the piston while air pressure is admitted to the opposite side of the piston, so that in effect, air travels through the pipes 58, 60 in both directions.

An air supply conduit 68 connects the control valve 62 to a hand actuated shut off valve 70 preferably mounted on the instrument panel 72 in the cab 16, and the shut off valve is, in turn, connected by a conduit 72 to a compressed air pump or air compressor 74 driven by the truck engine 14 in any conventional manner.

An air escape valve 76 is interposed in the length of the conduit 72 to facilitate continuous operation of the compressor 74 after a predetermined maximum pressure is built up in the compressed air system, and the compressed air system also includes a storage tank 78 which is connected to the aforementioned conduit 68 by means of a line 80. Moreover, a pressure indicating gauge 82 may be provided on the instrument panel 72 and connected to the conduit 68 as at 84.

Referring now to the construction of the control valve 62, this consists of a substantially cylindrical housing 86 secured in any suitable manner to the underside of the floor board 64 and provided in one side thereof with an air inlet port 88 with which the aforementioned conduit 68 is in communication. As is best shown in Figure 4, a pair of exhaust ports are also provided in the side of the housing 86 at longitudinally spaced points above and below the inlet port 88, these exhaust ports being designated for purposes of convenient identification as the first exhaust port 90 and the second exhaust port 92.

The diametrically opposite side of the housing 86 is formed with first and second, longitudinally spaced air outlet ports 94, 96 respectively, these communicating with the respective air pipes 58, 60. A valve member 98 is slidably but non-rotatably positioned in the housing 86, this being effected by providing the valve member with a downwardly extending, polygonal shank 100 which is slidable in a complementary polygonal aperture 102 formed in one end of the housing 86 so that rotation of the valve member 98 is prevented. An actuating control rod 104 is also provided on the valve member 98, this control rod projecting outwardly from the housing 86 and extending above the floor board 64, its upward extremity being contacted by a foot pedal 106, as indicated in Figure 3. Suitable compression springs 108, 110 are provided in the housing 86 under the valve member 98 and between the floor board 64 and a stop washer 112 secured to the rod 104, these springs urging the valve member 98 upwardly against the upper end wall 114 of the housing 86.

The valve member 98 is formed with three transversely extending air passages, namely, the first passage 116, the second passage 118 and the third passage 120, arranged as is best shown in Figure 4.

Matters are so arranged that when the valve member 98 is in its depressed position as shown in Figure 4, the first passage 116 connects the first outlet port 94 with the inlet port 88, while the second passage 118 connects the second outlet port 96 with the second exhaust port 92. Under such circumstances compressed air is delivered from the conduit 68 through the passage 116, the pipe 58, the hose 54 and the line 48 into the upper end of the cylinder 44, thus sliding the piston rod 42 downwardly to disengage the latch members 28, 30. Simultaneously, downward movement of the piston rod in the cylinder 44 will force air through the pipe 50, hose 56, pipe 60 and passage 118 into the atmosphere through the exhaust port 92.

However, when foot pressure on the pedal 106 is released, the valve member 98 is slid by the spring 108 upwardly in the housing 86 against the wall 114, so that the passage 118 connects the outlet port 94 with the exhaust port 90, while the third passage 120 connects the outlet port 96 with the inlet port 88, whereby compressed air is delivered from the conduit 68 through the passage 120, pipe 60, hose 56 and line 50 to the lower end of the cylinder 44, thus sliding the shaft 33 forwardly and engaging the latch members 28, 30. Simultaneously, air is discharged from the upper end of the cylinder 44 through the line 48, hose 54, pipe 58 and passage 118 into the atmosphere, through the medium of the exhaust port 90.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

The combination of a dump truck including a chassis, an operator's cab provided thereon, fulcrum means provided at the rear end of the chassis, a dump body having its rear end portion connected to said fulcrum means and having a front end wall spaced rearwardly from said cab, a swingable end gate on said body and a gate control comprising a latch slidably mounted on the rear portion of the body and engageable with said gate, an air cylinder mounted on the front end wall of the body in the space between said end wall and said cab, linkage extending longitudinally of the body and operatively connecting said cylinder to said latch, an air compressor on said chassis, an air control valve provided in said cab and connected to said compressor, a pair of air pipes connected at one end thereof to said valve and extending on said chassis to a point adjacent said fulcrum means, a pair of air lines connected at one end thereof to said cylinder and extending on said body to a point adjacent the fulcrum means, and a pair of flexible hoses connecting the other ends of the respective air pipes to the respective air lines.

NOAH HELSEL, Jr.

References Cited in the file of this patent

UNITED STATES PATENTS

| Number | Name | Date |
| --- | --- | --- |
| 1,113,129 | Marr | Oct. 6, 1914 |
| 1,961,193 | Brumbaugh | June 5, 1934 |
| 2,072,998 | Allin | Mar. 9, 1937 |
| 2,148,798 | Barrett | Feb. 28, 1939 |
| 2,220,202 | Bohne | Nov. 5, 1940 |
| 2,223,590 | Alden | Dec. 3, 1940 |
| 2,237,838 | McClish | Apr. 8, 1941 |
| 2,261,745 | Sand | Nov. 4, 1941 |
| 2,431,588 | Sharpe | Nov. 25, 1947 |